Nov. 11, 1930.  E. E. WINKLEY  1,780,990
MACHINE FOR OPERATING UPON BLANKS
Filed Oct. 7, 1922    5 Sheets-Sheet 2

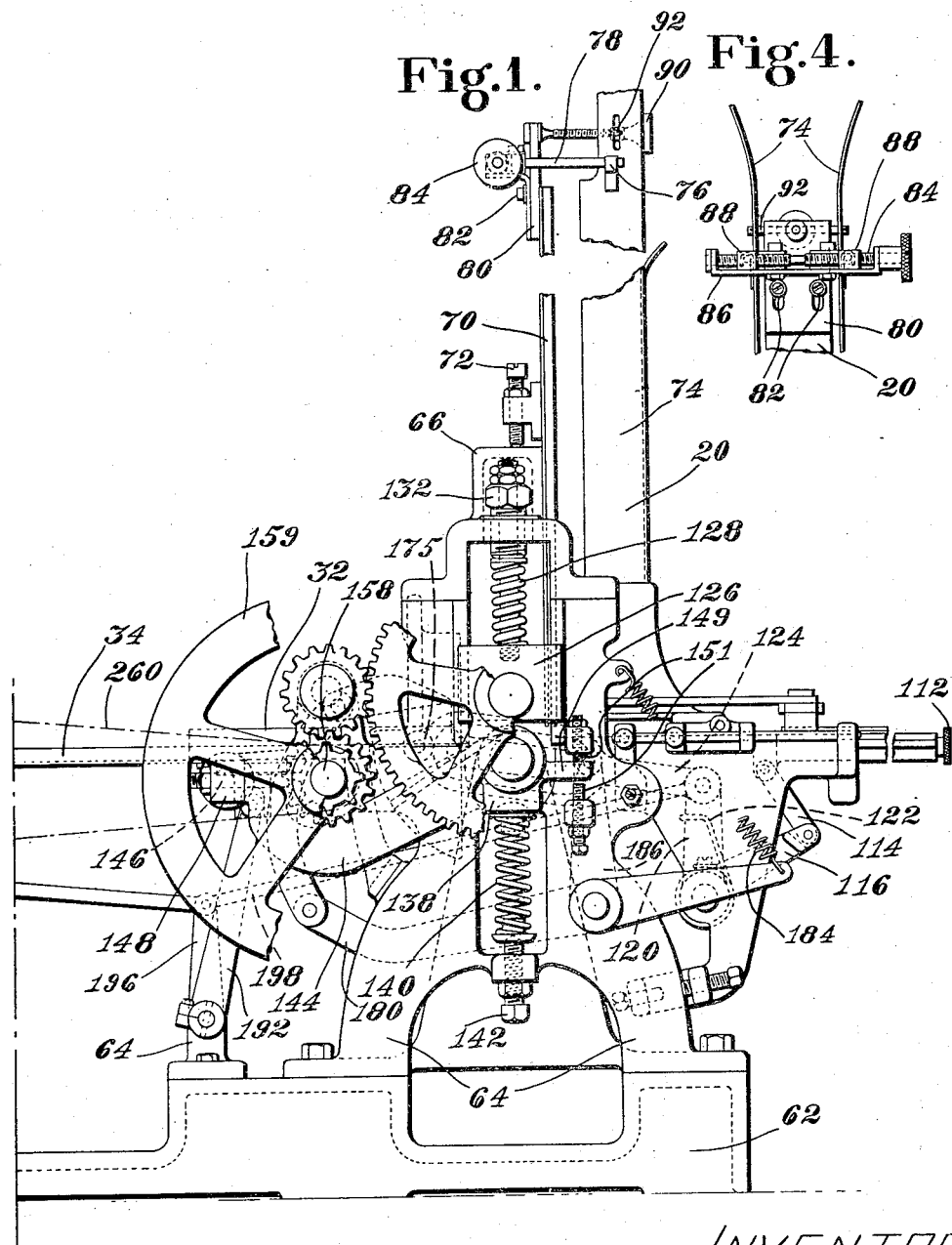

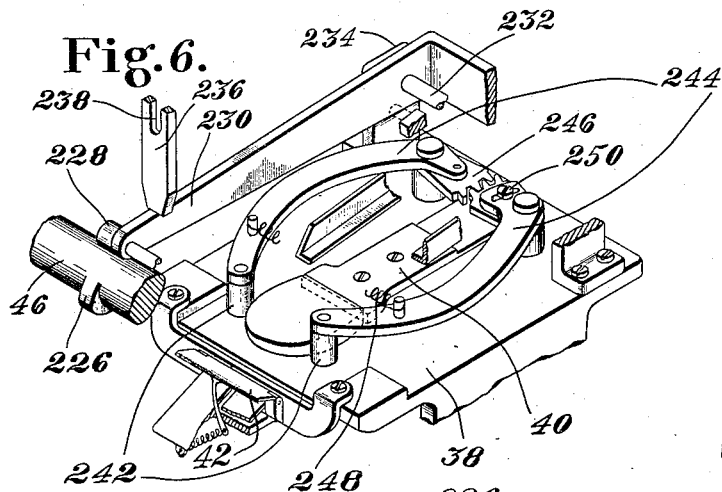
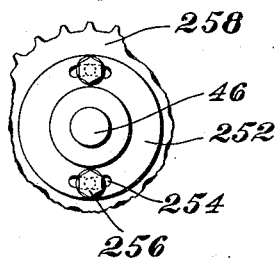
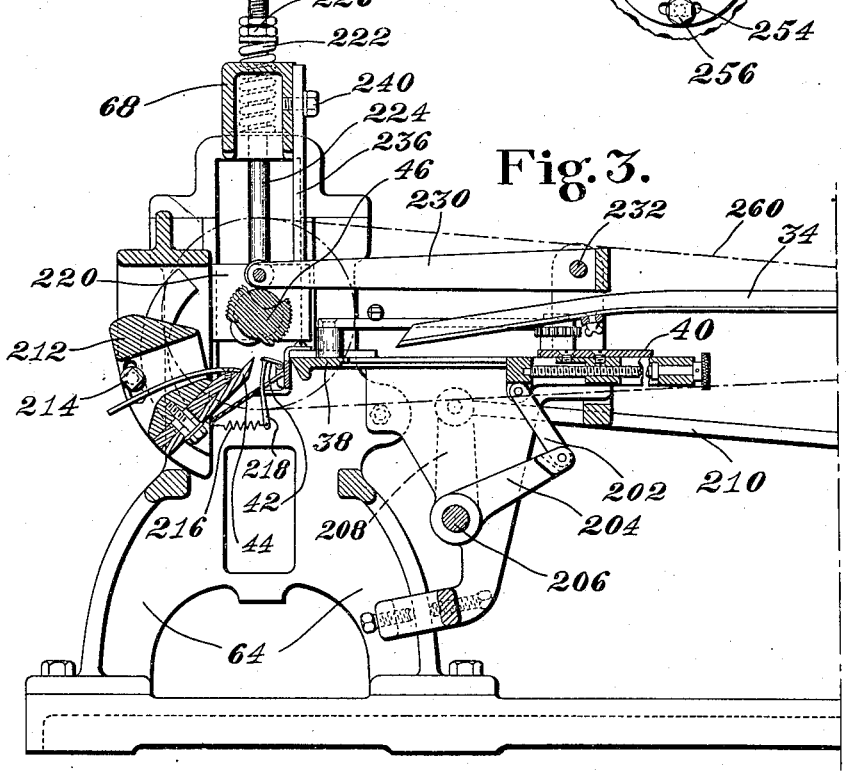

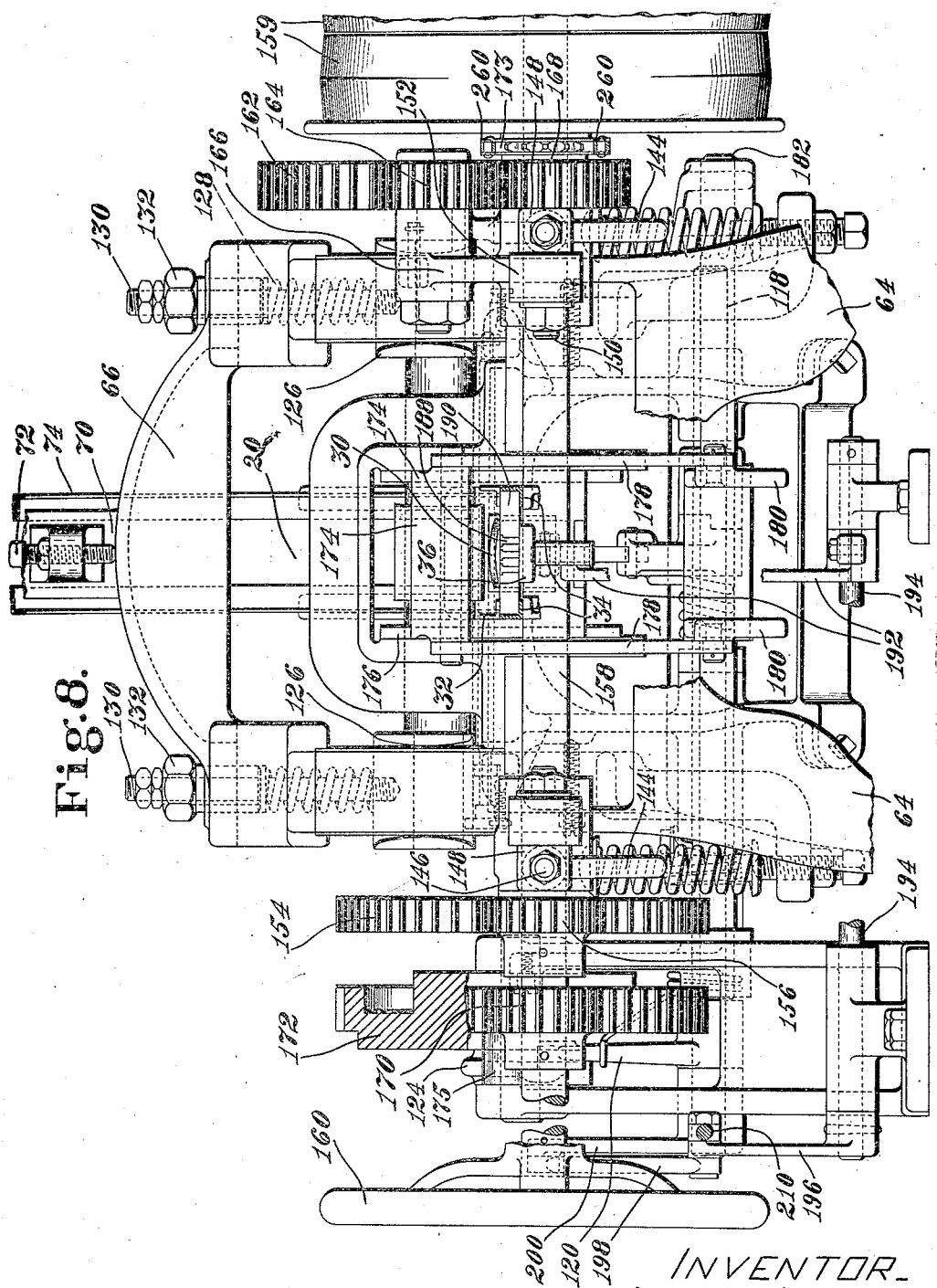

Fig. 9.
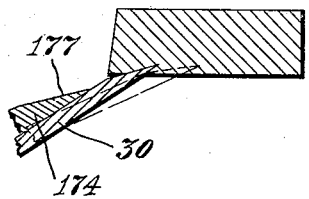
Fig. 10.
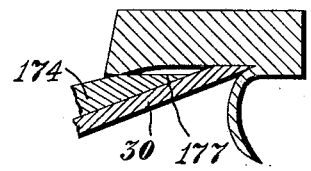
Fig. 11.
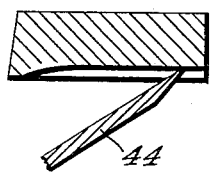
Fig. 12.
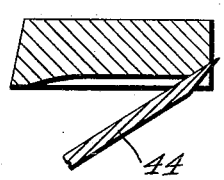
Fig. 13.
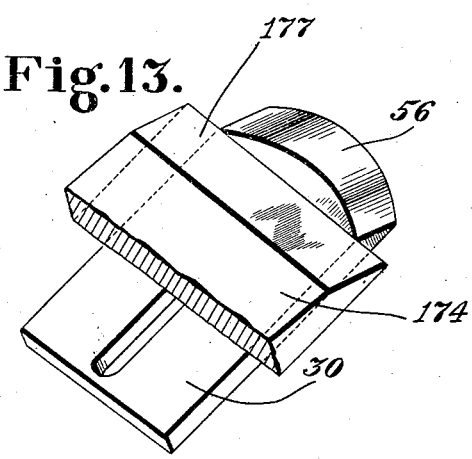
Fig. 14.
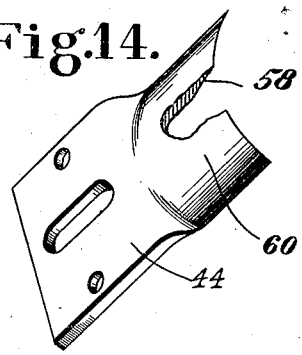
Fig. 15.
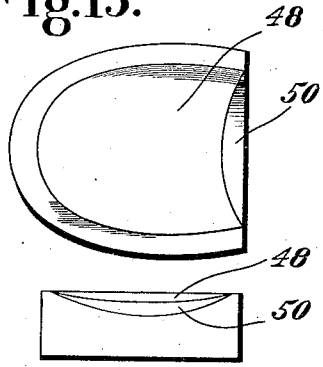
Fig. 16.
Fig. 17.
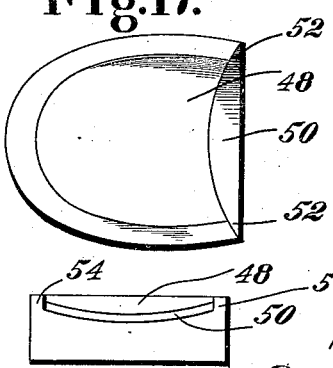
Fig. 18.
INVENTOR
Erastus E. Winkley
By his Attorney
Nelson W. Howard Patented Nov. 11, 1930

1,780,990

UNITED STATES PATENT OFFICE

ERASTUS E. WINKLEY, OF LYNN, MASSACHUSETTS, ASSIGNOR TO UNITED SHOE MACHINERY CORPORATION, OF PATERSON, NEW JERSEY, A CORPORATION OF NEW JERSEY

MACHINE FOR OPERATING UPON BLANKS

Application filed October 7, 1922. Serial No. 593,126.

This invention relates to machines for preparing blanks for use in the manufacture of heels, and is herein illustrated as embodied in a machine for gouging the seat surface of each of a succession of such blanks, and for removing stock from the breast end of the gouged seat surface of each blank to form what is variously known as a "Coburn" or "blended" or "double" lip.

It has long been customary to compress heel blanks in such a manner as to form a concave seat surface on each blank and to deepen the concavity toward the breast end of the seat surface of each blank to form the lip. In compressing a blank in this manner, however, the periphery of the blank is compressed much less than the central portion, and unless a tremendous pressure is applied the periphery of the blank will not be condensed sufficiently to take a proper finish and to prevent possible opening or gaping between the edges of adjacent lifts. Furthermore, such a heavy pressure often injures the heel blanks, as for example by cracking or breaking them.

Moreover, in recent years a constantly increasing proportion of the heel blanks which are used are of a relatively low height which does not afford sufficient material in the central part of each blank to allow sufficient condensation to provide a cavity of the desired depth. This is especially true of the low blanks formed of two or three lifts which serve as bases for rubber heels. Even where such low blanks can be satisfactorily compressed into the desired shape, the breast end of each blank must be so highly condensed in forming the desired lip as to add considerably to the difficulty of properly breasting the resulting heel.

To obviate the above described difficulties, it has been found necessary to remove sufficient stock from the seat surfaces of many heel blanks to form the desired "gouge" cavity and the deeper cavity known as the lip. Up to within the last few years it was necessary to provide two machines for this work, one of which gouged the blank, and the other of which formed the desired lip. More recently it has been found possible satisfactorily to gouge and lip the relatively thin leather bases for rubber heels in a machine which distorts each blank in such a manner that a straight knife removes waste material to gouge and lip the blank, but such a machine can not treat the thicker blanks. Machines have also been built for gouging and lipping flat heel blanks in a single machine by the use of a single cutter. Since, however, the cross-section of a lip cavity and the cross-section of a gouge are preferably curves of different radii, a machine of this character, as so far designed, can do no more than approximate the preferred shape of the seat surface leaving the heel compressor to finish the operation.

In view of these and other considerations it is one object of the present invention to provide a machine which will gouge and lip either thick or thin blanks accurately, so that no part of the shaping remains to be done by compression, thus making it possible to compress the blanks with substantial uniformity. From this point of view, the invention may be regarded as comprising the combination of means for forming gouging and lip-forming cuts of the same width but of different curvatures, with mechanism for relatively moving said means and the heel blanks to effect the gouging and lip cutting of each blank. In the illustrated construction separate cutters or equivalent devices are used, one of which forms in each blank a gouge, and the other of which forms a lip cavity, the gouge and lip cavities being of the desired different curvatures. In the embodiment of the invention illustrated in the accompanying drawings, gouging and lip cutting knives are arranged to co-operate with a plurality of intermittently effective feed devices which advance heel blanks into position to be operated upon successively by the two knives.

In another aspect my invention contemplates an improvement in heel gouging and similar machines which consists in the provision of means for relatively tilting a heel blank and a gouging knife after the knife has been inserted into the blank so that the entering and gouging cuts will be formed at such an angle to the knife that the knife operates with a slicing action throughout both cuts. In the illustrated machine, a yieldingly supported bottom roll and a matrix roll are arranged on opposite sides of the cutting edge of the knife to force a heel blank against and past the knife, and means is provided for tilting the knife about an axis lying within the plane of, and passing substantially tangent to the cutting edge, after the matrix roll has forced the knife into the blank to the full depth of the desired gouge. Of especial utility in a construction of this sort, although not limited to such use, is an arrangement by which a flat knife is provided with a cylindrically ground surface arranged to provide a curved cutting edge and an adjacent bevel so that the flat knife will produce a gouge of the desired curvature. When a knife of this character is used, instead of requiring the provision of a number of curved or hollow knives of different curvatures, it is sufficient to provide a number of identical flat knives and grind them in a manner to provide the desired cylindrical surfaces of different radii. A further feature of the gouging mechanism is to be found in the provision of means for adjusting the machine to form gouged blanks either (1) gouged to a predetermined depth, or (2) of predetermined thickness between the tread and gouged seat surfaces.

Another object of my invention is to provide an improved and simplified lip forming mechanism by mounting a stationary knife in position to co-operate with a blank feeding and depressing roller which is controlled by a novel cam mechanism to force blanks successively against the knife to form lips thereon as will be described. The illustrated form of this simplified lip forming mechanism includes a yieldingly supported table adjacent to the cutting edge of the knife so that the knife may be mounted with its cutting edge directly below the axis of the depressing roll, and a reciprocating pusher which advances the blanks successively on to the table with their seat surfaces above the knife in position for the above-described roll to force them against the knife. In such an arrangement as is illustrated, the feed pusher and the novel cam mechanism for depressing the roller will operate in timed relation, and preferably an adjusting device is provided for varying this relation so that lips of different lengths can be formed on blanks of different sizes. I also prefer to provide an adjusting device arranged to vary the extent to which each blank is depressed to vary the depth of the lip cavity.

Other features of my invention, including improved feed mechanism for transferring blanks from one part of the machine to another, an improved mounting for gouging and similar knives comprising a surface limiting the depth of cut and supporting the blanks, will be apparent from the following description of the embodiment of my invention illustrated in the accompanying drawings, in which Figs. 1 and 2 are, respectively, a side elevation and a longitudinal section through that part of the machine which includes a magazine for blanks and the gouging mechanism;

Fig. 3 is a longitudinal section through the lip forming part of the machine which joins on at the left of Fig. 1;

Fig. 4 is a front elevation of the top part of the magazine shown in Fig. 1;

Fig. 6 is an isometric view, partly broken away, illustrating the means for feeding the blanks to the lip forming mechanism illustrated in Fig. 3;

Fig. 7 is a side elevation of part of the driving means for the lip forming mechanism, showing the adjusting device for changing the timed relation between the operation of the reciprocating feed pusher and the blank depressing cams;

Fig. 8 is a section on the line 8—8 of Fig. 2, showing a rear elevation of the gouging devices shown in section in Fig. 2;

Figs. 9, 10, 11 and 12 are sectional diagrammatic views illustrating the gouging and lipping of a blank by the machine;

Fig. 13 is an isometric view of the gouging knife and part of its carrier;

Fig. 14 is an isometric view, partly broken away, of the lip forming knife;

Figs. 15 and 16 are, respectively, a top plan view and an end elevation showing a heel blank after it has been gouged and lipped in the machine;

Figure 5:
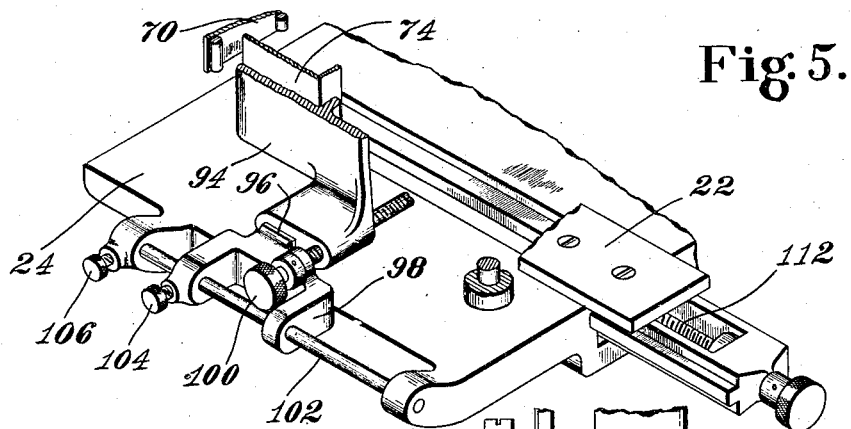
Fig. 5 is an isometric view, partly broken away, showing part of the mounting of the magazine illustrated in Fig. 1.

Fig. 17 is a top plan view of a blank showing the result of attempting to gouge and to lip with a single cutter as for example the cutter shown in Fig. 13 or that shown in Fig. 14; and Fig. 18 is an end elevation of a gouged and lipped blank showing the result of attempting to obviate the cutting away of the corners of the blank as shown in Fig. 17, when using a single cutter, by limiting the length of the cutting edge.

The general organization of the illustrated machine includes a magazine 20 for a stack of heel blanks, a reciprocating pusher 22 for advancing blanks successively from the bottom of the magazine across a horizontal table 24 between a yieldingly supported bottom roll 26 and an upper or matrix roll 28 which co-operate to feed the blanks successively against and past a gouging knife 30, and which deliver the blanks upon a second table or horizontal guide 32. As the blanks accumulate on this guide they are pushed one by one on to a third horizontal guide or chute 34 comprising a pair of adjustably-mounted spaced angle irons (Figs. 3, 6 and 8) along which they are advanced by means of a reciprocating pusher 36. The blanks are deposited successively by chute 34 on a table 38 in front of a reciprocating pusher 40 which operates to place them successively on a spring supported table or work support 42, with the seat surface of each blank immediately above a lip-forming knife 44 against which it is depressed by a feeding and depressing roll 46. Various parts of the operating mechanism may be, and are shown as being, the same as corresponding parts illustrated in United States Letters Patent No. 1,123,369, granted Jan. 5, 1915, on application of J. H. Pope.

The finished blank is shown in plan in Fig. 15 and in end elevation in Fig. 16, and includes a gouged cavity 48 produced by the knife 30 and a lip cavity 50 produced by the knife 44. As will be apparent from Fig. 16 these cavities are of different curvatures in cross-section but are of the same width. It is for this reason that it has up to the present time been found impossible to produce on undistorted blanks a finished, accurate result such as shown in Figs. 15 and 16 by the use of a single cutter which is necessarily of a constant curvature. As shown in Fig. 17, if it is attempted to gouge and lip with a single cutter, whether a rotary cutter or such a knife as is shown in Figs. 13 or 14, by forcing the cutter more deeply into the stock of the heel, while a satisfactory gouge 48 will be produced, the lip 50 will increase in width as it becomes deeper and will cut off the breast shoulders of the ungouged margin, as shown at 52. On the other hand if it is attempted to avoid cutting off these shoulders by limiting the length of the cutting edge of the knife, as by using a rotary milling cutter or by adding cutting sides to a knife such as shown in Fig. 13 or Fig. 14 to produce a cutter of general U shape, the result shown in Fig. 18 will be produced in which the gouge 48 and the lip 50 will be of the same curvature, and in which abrupt shoulders 54 will be formed on opposite sides of the blank. While results such as shown in Fig. 17 or Fig. 18 are satisfactory for some kinds of work, inasmuch as the heel compressor substantially makes up for the inaccuracies shown at 52 in Fig. 17 and at 54 in Fig. 18, it is an important advantage of my invention that the use of the two cutters, or equivalent means for producing the gouge 48 and the lip 50 of different curvatures as shown in Figs. 15 and 16, the results in a gouged and lipped blank which is substantially in the desired shape before it is compressed. This makes it possible to gouge and lip blanks of any character on a machine of the illustrated type, thus resulting in what is practically a universal machine. So far as I am aware, the result shown in Figs. 15 and 16 has previously been produced only on relatively thin blanks which can be distorted as described in application Serial No. 558,684, filed May 5, 1922, in the name of Ralph S. Megathlin, or by performing the two operations in separate machines. Gouging and lipping in separate machines not only doubles the labor cost of the operations, as compared with my improved machine, but necessitates great care in gaging the operations so that the lip and the gouge will register exactly.

Figs. 9, 10, 11 and 12 illustrate the operation of the two cutters 30 and 44 on a heel blank. Figs. 9 and 10 illustrate successive steps in the gouging operation, the knife 30 being inserted into the blank as shown in Fig. 9 at one angle, and then tilted (usually from 15 to 25°) about an axis passing substantially parallel to the flat knife and tangent to the cutting edge at its highest point, into the position shown in Fig. 10 for the gouging cut. Either before or after the gouging operation, the knife 44 or an equivalent device operates as shown in Figs. 11 and 12 to form the lip 50.

Figure 2:
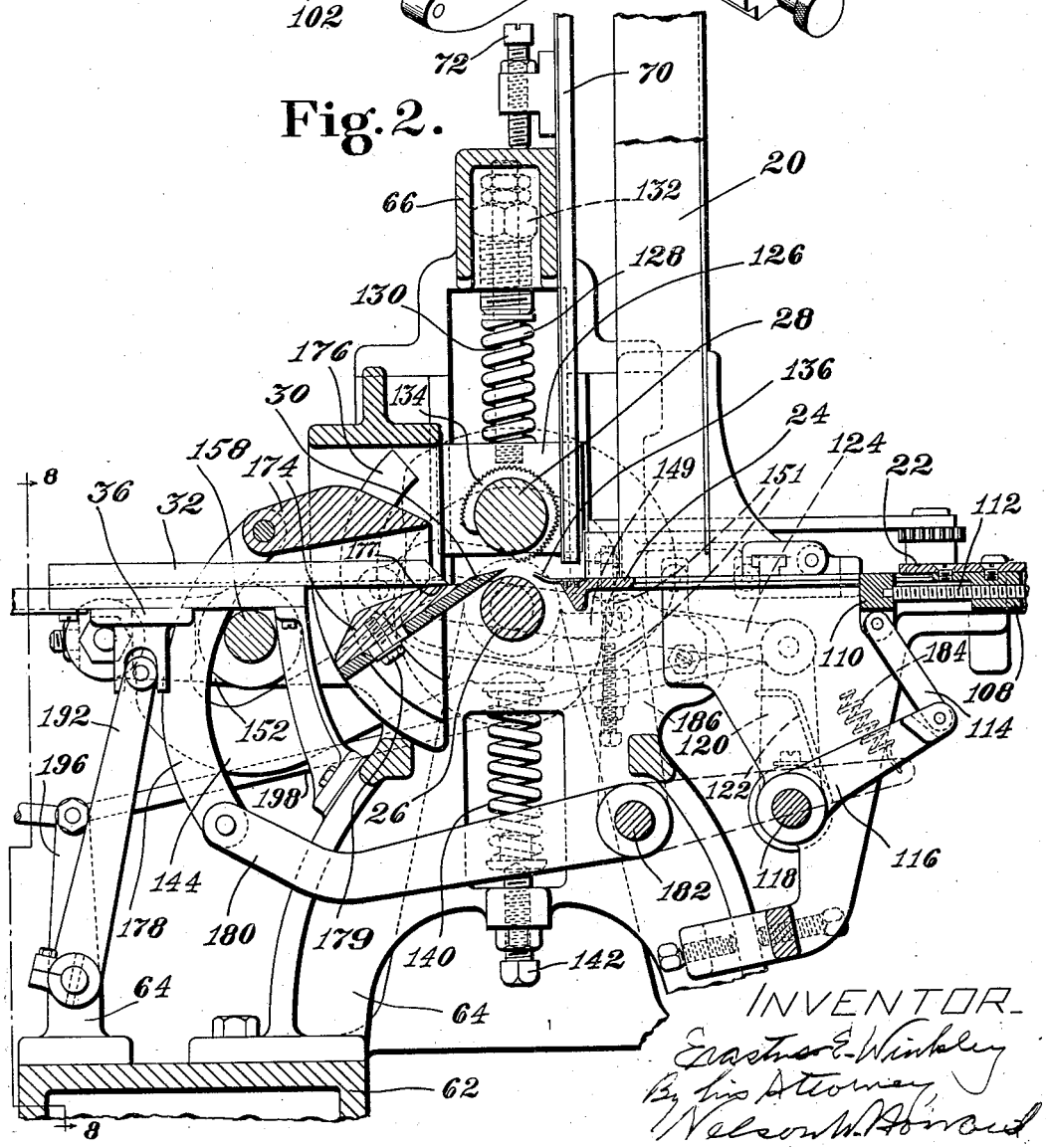

As shown in Fig. 13, the gouging is preferably done by a flat knife 30 of the "drag" type, the cutting edge being formed by the intersection of one of the flat sides of the knife with a cylindrically ground surface 56. As will be apparent from Fig. 13, the plane formed by the flat side of the knife intersects the cylindrical surface 56 at an acute angle so that the cutting edge is an arc of a curve of general elliptical form which, when mounted as shown in Figs. 2 and 10, has a vertical projection the same as the desired cross-sectional curvature of the gouge 48. Among other advantages, this permits the use of stock knives 30 which may be ground with cylindrical surfaces 56 on different radii to provide different curvatures for different sizes of heels. It moreover permits the knife to be held as shown in Fig. 9 so that the cylindrically beveled surface 56 has its elements parallel to the direction of feed of the heel during the entering cut, after which the knife may be tilted to the position shown in Fig. 10 about an axis passing substantially parallel to the surface of the knife and tangent to the highest point of the cutting edge so that during the gouging cut the elements of surface 56 are also parallel to the direction of relative movement of the heel blank and knife. Thus the surface 56 acts to guide the knife and prevents it from "digging in" and also prevents any tendency for the knife to tear the stock instead of making a clean slicing cut. Previous gouging machines of the type using curved knives have the bevel on the opposite side of the knife so that it has no action in guiding the knife to provide such a slicing cut, and this inevitably results in a marked tearing action on the stock of the heel blanks, preventing the production of a finished article such as is illustrated in Figs. 15 and 16. In order that the lip cut produced by the knife 44 shall also be a clean slicing cut, it is beveled, as shown in Fig. 14, on the concave side of the curved cutting edge at 58 so that the cylindrical side 60 acts to guide the knife through the stock, as shown at Fig. 12.

The general operation of the machine having been set forth above, the details of the operating mechanism will now be described. The machine is mounted upon a suitable base 62 (Fig. 1) to which are secured frame members 64 of a suitable shape formed with bearings for rotary power shafts and arranged to support the above described tables and guides 24, 32, 34 and 38. A cross-bracing member 66 is secured in any suitable manner to the frame members 64 adjacent the gouging mechanism, and a similar cross-bracing member 68 is provided for the lip forming mechanism.

The heel blanks are arranged in a vertical stack in the magazine 20, which may include a front plate 70 slidingly held against the cross-bracing member 66 and arranged to be vertically adjusted relatively thereto by means of an adjusting screw 72. The sides of the magazine are formed of two plates 74 arranged with angular guides 76 which embrace L-shaped carriers 78. To permit the guides 76 to remain in engagement with the carriers 78 regardless of the vertical position of the front plate 70, the latter is made in two parts, the upper part 80 being formed with vertical slots through which pass clamp screws 82 (Fig. 4). A right and left threaded screw 84 is mounted in a bracket 86 carried by the plate 80, the right and left threaded portions engaging threaded recesses in blocks 88 secured to the opposite guides 78 so that manipulation of the screw 84 adjusts the side plates 74 toward and from one another. The plates 74 are mounted for adjustment toward and from the plates 70 and 80 by means including an adjusting member 90 (Fig. 1) which is threaded through a block carried by a cross bar 92, and which is formed at one end with a bearing for engaging the member 80 and imparting to that member any lengthwise movement of the member 90 relatively to the plates 74. As shown in Fig. 5, the bottom part of the plates 74 are held by supports 94, each of which is formed with a socket to embrace a slide 96 on a carrier 98. The supports 94 are adjusted in and out on the slides 96 by means of adjusting screws 100. The carriers 98 are formed with arms embracing cylindrical guides 102 carried by the table 24, which may be clamped in place by set screws 104. The guides 102 may be removed by loosening set screws 106 (and 104) or the screws 104 may be loosened and the supports 94 and slides 96 swung vertically about the guides 102 when it is desired to dismount the magazine.

The blanks are advanced successively from the bottom of the magazine 20 by the reciprocating pusher 22 sliding over the top of the table 24. The pusher 22 is shown in Figs. 2 and 5 in the form of a plate which may be secured to a slide 108 which in turn is connected to an operating slide 110 by means of an adjusting screw 112 so that the pusher plate may be adjusted toward and from the operating mechanism of the machine. The operating slide 110 is moved back and forth by means of a link 114 connected to a rock arm 116 carried by a shaft 118 which is rocked back and forth by an arm 120 which is urged in one direction by a torsion spring 122 and in the other direction by a cam-operated link 124, as in the machine shown in the above-mentioned Pope patent.

The matrix roll 28 is journaled in slides 126 guided in slots in opposite sides of the frame of the machine. Each of the slides 126 is urged downwardly by means of a heavy compression spring 128 surrounding a bolt 130, so far as permitted by a stop 132 which engages the upper side of the cross-brace 66 (Fig. 8). As shown in Fig. 2, the roll carries a matrix portion 134 which is cut away on one side so that the pusher 22 may freely advance a blank into position to be forced against the knife 30. The blank is directed upwardly to prevent it from catching on the cutting edge of the knife by a guiding leaf spring 136. The first engaging portion of the matrix 134 is only of sufficient thickness to engage lightly the tread surface of a blank so positioned, after which the matrix increases in thickness for a short distance to force the blank against the knife to insert the knife into the stock. The remainder of the matrix portion 134 is of uniform thickness,—that is to say, its surface is substantially cylindrical,—so that the blank will be fed horizontally across the knife as shown in Fig. 10 to form the gouge. If desired, the matrix 134 may be provided with teeth, as illustrated in Fig. 2, to aid in its feeding action.

During the above described operation, the blank is supported by the roll 26 which is journaled at its opposite ends in blocks 138 (Fig. 1). These blocks are positioned in guide slots formed in opposite sides of the machine and are supported by means of spring 140 which are relatively light as compared to the springs 128. The tension of springs 140 may be changed by means of threaded adjusting devices 142. The blocks 138 are mounted in the ends of swinging arms 144 which are swiveled on horizontal pivots 146 on blocks 148, as shown at the left in Fig. 8. As shown at the right in that figure, each of the blocks 148 carries a horizontal pivot 150 at right angles to pivot 146, mounted in a bearing in an arm 152 of the machine frame.

This provides a swivel mounting for each of the arms 144 so that opposite ends of the shaft 26 may, if necessary, be depressed different distances. This arrangement is substantially similar to that illustrated in the above-identified United States Letters Patent No. 1,123,369, and more fully described in United States Letters Patent No. 894,850, granted Aug. 4, 1908, on application of F. J. Nash. Each block 138 is formed with an arm 149 (Fig. 1), arranged for engagement with set screws 151, adjustably to limit its upper and lower positions. The springs 128 permit the matrix roll to yield when roll 26 is in its lowermost position.

It is to be noted that provision of the set screws 151, or equivalent adjusting means, permits adjustment of the machine to produce either (1) a gouged blank having a gouge of predetermined depth or (2) a gouged blank of predetermined thickness between its tread and seat surfaces. Thus if the lower set-screws 151 are adjusted down to an inoperative position, a gouged blank of a predetermined thickness will be produced, this thickness being equal to the vertical distance between the cutting edge of the knife and a horizontal plane tangent to the matrix 134. On the other hand, the lower set-screws 151 may be adjusted upwardly to limit the insertion of the knife in the blank to produce a gouge of a predetermined depth, the matrix roll yielding upwardly to permit this method of operation.

The yieldingly supported roll 26 carries a gear 154 (Fig. 8) meshing with a smaller gear 156 on a drive shaft 158 journaled in the above mentioned arms 152 of the machine frame. This drive shaft may be motor driven from the usual fast and loose pulleys 159 or may be turned manually by means of a hand wheel 160.

As shown at the right in Fig. 8, the matrix roll 28 is driven by a gear 162 meshing with a smaller gear 164, which is carried by a vertical extension 166 of the arm 152; the small gear 164 being driven in turn by a second small gear 168 on drive shaft 158.

The drive shaft 158 also carries a small gear 170 engaging a gear surface on a cam member 172 mounted at the left hand side of the machine frame as shown in Fig. 8, and also a sprocket 173 at the right, the purpose of which sprocket will be hereinafter more fully explained. The member 172 has one portion engaged by a roll 175 carried by the link 124, and part of this link is slotted to embrace the shaft which carries the cam member 172 (Figs. 1 and 8). This arrangement is more fully described in the above-mentioned Pope patent.

The gouging knife 30 is clamped to a carrier 174 by means of a screw 179 passing through a slot in the knife to permit adjustment of the knife towards the bite of the feed wheels as it is ground away. As shown in Fig. 2, the carrier 174 is formed with a central recess through which the gouged blanks may pass to the guide 32. The carrier 174 is slidably mounted upon arcuate slides 176 formed on the machine frame at opposite sides of the carrier. The axis of curvature of recesses 176 is substantially parallel to the surface of the knife and tangent to the highest point of the cutting edge so that the knife may be tilted about that axis after it has entered the blank. The carrier 174 is connected by a pitman 178 with a lever 180 carried by a rock shaft 182. The opposite end of the lever 180 is engaged by a coil spring 184 which constantly urges the knife 30 into its entering position. The shaft 182 is rocked to tilt the knife by means of an arm 186 carrying a cam roll for engaging a surface on cam 172.

As shown in Figs. 2, 9, 10 and 13, the carrier 174 may, if desired, be formed with a beveled surface 177 parallel to the elements of surface 56 of the knife 30. When the carrier is operated to tilt the knife from the position shown in Figs. 2 and 9 to the position shown in Fig. 10, surface 177 becomes parallel to, and is in alinement with tables 24 and 32, and engages the opposite uncut margins adjacent to the gouged portion of the blank. This limits the depth of cut to a fixed maximum, which is arranged to be equal to the depth of the gouge when set-screws 151 are adjusted for gouging blanks uniformly to a predetermined depth. Even more important, it steadies each blank as it is being gouged, positively preventing it from tilting and making for smoothness and uniformity in the action of the knife.

The blanks are pushed in succession along the horizontal guide 32 until they pass one by one from the end of this guide on to the lower guide 34 formed of spaced members L-shaped in cross-section, as shown in Figs. 3, 6 and 8. As shown in Fig. 8, the blanks are advanced along guide 34 by pusher 36 to which are secured a plurality of fingers 188. Each of these fingers is T-shaped in cross-section and slides in a T-shaped groove in a plate 190 which forms the bottom of the guide 32. The pusher 36 is formed with a lower projecting portion in which there is a vertical slot engaging a roll on the upper end of a lever 192 carried by a rock shaft 194 which is rocked back and forth by an arm 196 operated by a pitman 198 connected to a parallel arm 200 carried by the rock shaft 118 which is operated as above described by arm 120.

As the blanks are pushed successively from the end of the guide 34, they are deposited upon the table 38 in front of the pusher 40 as will be apparent from Figs. 3 and 6. The pusher 40 is constructed and arranged like the pusher 22, as to its adjustments, and is operated by means of a link 202 and an arm 204 carried by a rock shaft 206 operated by an arm 208 connected through a pitman 210 to the above-described arm 196. By this arrangement the pushers 22, 36 and 40 are operated in unison.

The lip cutting knife 44 is mounted on a carriage 212 which is generally similar to the carriage 174 except that it is arranged to be clamped in a fixed position by means of a clamp screw 214 passing through a slot into the machine frame.

As shown in Figs. 3 and 6, the spring supported table or member 42 is pivoted on a bracket secured to the table 38 and is urged upwardly by a light coil spring 216 connected at one end to the machine frame and at the other end to an arm 218 carried by the member 42.

The feed roll 46 is journaled at its opposite ends in sliding blocks 220 which are located in slots formed in opposite sides of the machine frame and is urged upwardly by means of springs 222 surrounding bolts 224 connected to the blocks 220 and passing through the cross-brace 68. The springs 222 engage the cross-brace 68 and are confined by threaded adjustable lock nuts 226. Integral with, or mounted on, roll 46 at its opposite ends are depressing cams 226 which engage roller abutments 228 carried by arms 230 pivotally mounted on a rod 232 carried by brackets 234 attached to the machine frame. The vertical position of the roller abutments 228 is determined by means of adjusting members 236 which engage the arms 230 at their lower ends, and which are formed with slots 238 through which pass clamp screws 240 to secure the adjusting members to the cross-brace 68. By changing the vertical position of the members 236 the vertical position of the roll 46 relative to the knife 44 may be varied.

The above-described arrangement of the table 42 and the roll 46 permits the knife 44 to be placed with its cutting edge substantially in vertical alinement with the axis of roll 46. As the knife cuts to a considerable depth in forming the lip, this arrangement, eliminating all tendency of the blank to tip when forced by the roll against the knife, is to be recognized as an important improvement in machines of this type.

As the blanks are advanced across the table 38 by means of the pusher 40, they are centered by means of rolls 242 carried by bell crank levers 244 geared together at 246 and yieldingly urged toward one another through the action of a spring 248. The relative position of the rolls 242 transversely of the machine may be changed by loosening a clamp screw 250 (Fig. 6), and changing the position of the right-hand gear segment on its lever 244.

In order to permit varying the timed relation between the operation of the pusher 40 and the cams 226, the roll 46 is secured to a disk 252 formed with slots 254 through which pass clamp screws 256 entering a sprocket wheel 258 loosely mounted on the roll 46 and arranged to be driven from the sprocket 173 on the drive shaft 158 by means of a sprocket chain as indicated in the dot-and-dash line 260 in Figs. 1, 3 and 8.

In the operation of the machine, heel blanks are advanced successively from the magazine 20 by means of the pusher 22, each blank being placed on roll 26 with its end overlapping the knife 30 at a time when the cut-away portion of the matrix 134 is facing downwardly. Immediately thereafter, the pusher being on its way back, the matrix engages and depresses the blank against the knife, and when it is completely depressed the knife is tilted to its gouging position. The blank is fed on across the knife to form the gouge and thereafter passes along the guides 32 and 34 and is pushed across the table 38 by means of the pusher 40. The member 42 and the cam-depressed roller 46 cooperate to feed the blank and to depress it against the knife 44, to form the lip cut.

While one form of my invention has been illustrated and described, it is not my intention to limit its scope thereby or otherwise than indicated by the terms of the appended claims. In many of its aspects the invention is not to be regarded as limited to the combined operation of gouging and lipping, inasmuch as many features of the invention are useful in machines for gouging alone or for lipping alone, and some features of the invention will also be useful in machines for performing different equivalent operations.

Having described my invention, what I claim as new and desire to secure by Letters Patent of the United States is:

1. A machine for gouging and lip-cutting heel-blanks comprising, in combination, cutting means for forming two related cuts of substantially the same width but of different depths and different curvatures, and means relatively to move a flat heel blank and said cutting means to make a shallow cut in the seat surface of the blank to form a gouge and to make an adjacent deeper cut at the breast end of said seat surface to form a lip.

2. A machine for gouging and lip-cutting heel-blanks comprising, in combination, cutting means for forming two related cuts of substantially the same width but of different depths and different curvatures, and mechanism to operate said cutting means to make a shallow cut in the seat surface of a heel blank to form a gouge and to make an adjacent deeper cut at the breast end of said seat surface to form a lip.

3. A machine for gouging and lip-cutting heel-blanks comprising, in combination, cutting means for forming two related cuts of substantially the same width but of different depths and different curvatures, and feed mechanism to present flat heel-blanks successively to said means to make on each blank a shallow cut in the seat surface of the blank to form a gouge and to make an adjacent deeper cut at the breast end of said seat surface to form a lip.

4. A machine for gouging and lip-cutting heel blanks comprising, in combination, heel gouging means, lip-cutting means, and means for presenting heel blanks thereto.

5. A machine for gouging and lip-cutting heel blanks comprising, in combination, a cutter for gouging the seat surface of a heel blank, a cutter for removing material at the breast end of the seat surface to form a lip, and means for presenting heel blanks to said cutters.

6. A machine for gouging and lip-cutting heel blanks comprising, in combination, a knife for gouging the seat surface of a heel blank, lip-cutting means, and feeding mechanism to present heel blanks to said knife and said means for providing a gouged and lipped seat surface on each blank.

7. A machine for gouging and lip-cutting heel blanks comprising, in combination, means to gouge the seat surface of a heel blank, a knife to cut a lip at the breast end of said seat surface, and feed mechanism to present heel blanks to said means and said knife to provide a gouged and lipped seat surface on each blank.

8. A machine for gouging and lip-cutting heel blanks comprising, in combination, a knife for gouging the seat surface of a heel blank, a knife for cutting a lip on a heel blank, and feed mechanism for presenting a heel blank and for relatively moving the blank and the knives to provide a gouged and lipped seat surface on the blank.

9. A machine for gouging and lip-cutting heel blanks comprising, in combination, a cutter for gouging the seat surface of a heel blank, a cutter for forming a lip on blanks gouged by the first cutter, and means for transferring gouged blanks from the first cutter and presenting them to the second cutter and relatively moving the blanks and said cutter to form a lip on each blank.

10. A machine for gouging and lip-cutting heel blanks comprising, in combination, means for supporting and positioning a heel blank, separate cutters for gouging the heel blank and for cutting a lip in the breast end of its seat surface, and means for relatively moving the cutters and a blank supported and positioned by said first means to gouge and lip the seat surface of the blank.

11. A machine for gouging and lip-cutting heel blanks comprising, in combination, separate cutters for gouging a heel blank and for cutting a lip at the breast end of its seat surface, and means for relatively traversing a heel blank and said cutters to gouge the seat surface of the blank and cut a lip in the breast end of the seat surface.

12. A machine for gouging and lip-cutting heel blanks comprising, in combination, means to engage and support the tread face of a heel blank, a gouging knife to operate on the seat surface of a blank supported thereby, said knife having a bevel on the side next the heel blank, means for relatively traversing the knife and the blank in a direction parallel to the elements of the beveled surface of the knife to gouge the seat surface by a slicing cut, and means for cutting a lip at the breast end of the gouged seat surface of the blank.

13. A machine for gouging and lip-cutting heel blanks comprising, in combination, means to engage and support the tread face of a heel blank, a flat gouging knife to operate on the seat surface of a blank supported thereby, said knife having its end ground in a curved bevel to produce a gouge surface, means for relatively traversing the knife and the blank in a direction parallel to the elements of the beveled surface of the knife to gouge the seat surface by a slicing cut, and means for cutting a lip at the breast end of the gouged seat surface of the blank.

14. A machine for gouging and lip-cutting heel blanks comprising, in combination, a flat gouging knife having a bevel on one side, a curved lip cutting knife having a bevel on the opposite side, and means for relatively traversing a heel blank and said knives with the body of the blank on the beveled side of the gouging knife and opposite the beveled side of the lip-cutting knife.

15. A machine for gouging and lip-cutting heel blanks comprising, in combination, feed rolls and a cutter co-operating to gouge the seat surface of a heel blank, a feed roll and a second cutter co-operating to cut a lip at the breast end of the seat surface of said blank, and means for guiding gouged blanks from the first set of feed rolls to the lip forming feed roll and cutter.

16. A machine for gouging and lip-cutting heel blanks comprising, in combination, a magazine for heel blanks, gouging means, lip-cutting means, and means for separating blanks successively from the magazine and presenting them to said gouging and lip-cutting means.

17. A machine for gouging and lip-cutting heel blanks comprising, in combination, a magazine for heel blanks, a cutter for gouging the seat surface of a blank, a second cutter for cutting a lip at the breast end of the seat surface of a blank, and mechanism for feeding blanks successively from said magazine and for relatively traversing each blank and said cutters to gouge the seat surface of each blank and cut a lip at the breast end of said surface.

18. A machine for gouging and lip-cutting heel blanks comprising, in combination, a cutter for gouging the seat surface of a heel blank, a second cutter for forming a lip at the breast end of the seat surface of a heel blank, a reciprocating feed pusher to advance blanks successively into the machine, and mechanism for relatively traversing each blank and said cutters to gouge the blank and form a lip thereon.

19. A machine for gouging and lip-cutting heel blanks comprising, in combination, a guideway for a succession of heel blanks, means adjacent one part of the guideway for gouging the seat surface of each blank, means adjacent another part of said guideway for cutting a lip at the breast end of the seat surface of each blank, and a plurality of feed devices operating in timed relation to one another to advance a succession of heel blanks along said guideway and present them successively to the gouging and lip-cutting means.

20. A machine for gouging and lip-cutting heel blanks comprising, in combination, a horizontal guideway for a succession of heel blanks, a cutter adjacent one part of said guideway for gouging the seat surface of each blank, a second cutter adjacent another part of said guideway for forming a lip on each blank, and a plurality of feed devices operating in timed relation to advance a succession of heel blanks along said guideway and present them successively to said cutters.

21. A machine for gouging and lip-cutting heel blanks comprising, in combination, a horizontal guideway for a succession of heel blanks, a cutter adjacent one part of said guideway for gouging the seat surface of each blank, a second cutter adjacent another part of said guideway for forming a lip on each blank, and a plurality of intermittently effective feed devices for advancing a succession of heel blanks step-by-step along said guideway and for presenting each of said blanks successively to said cutters.

22. A machine for gouging and lip-cutting heel blanks comprising, in combination, a horizontal guideway for a succession of heel blanks, a cutter adjacent one part of said guideway for gouging the seat surface of each blank, a second cutter adjacent another part of said guideway for forming a lip on each blank, and a plurality of reciprocating feed pushers for advancing a succession of heel blanks step by step along said guideway and for presenting them successively to said cutters.

23. A machine for gouging and lip-cutting heel blanks comprising, in combination, spaced cutting and operating devices for gouging and for lip-cutting heel blanks, a guide at an upper level for receiving blanks from one of said devices, an adjacent guide at a lower level for directing said blanks to the other of said devices, and a reciprocating feed pusher operating between said guides to advance the blanks successively as they pass from the guide at the upper level to the guide at the lower level.

24. A machine for operating on heel blanks comprising, in combination, means for performing a preliminary operation upon a heel blank, a chute to receive blanks operated on thereby, a second chute at a lower level and adjacent the end of the first chute, means for performing a subsequent operation on blanks guided by the second chute, and a reciprocating pusher between the chutes to engage and advance blanks passing from the chute at the upper level to the chute at the lower level.

25. A heel gouging machine comprising, in combination, a gouging knife, means for relatively traversing a heel blank and said knife, and means for relatively tilting the blank and the knife when the knife has been inserted in the blank to the full depth of the gouge about an axis adjacent the cutting edge of the knife to change the angle of cut during the gouging cut as compared with the entering cut.

26. A heel gouging machine comprising, in combination, a gouging knife, means for relatively moving a heel blank and the knife to insert the knife into the blank to the full depth of the desired gouge, and means for abruptly relatively tilting the knife and the blank to change the angle of cut, said first means thereafter being effective for further traversing the knife and blank to gouge the seat surface of the blank.

27. A heel gouging machine comprising, in combination, a gouging knife, means for relatively moving the blank and knife to insert the knife into the blank and to traverse the knife and blank to gouge the seat surface, and means for abruptly tilting the knife when it has been inserted into the blank to the depth of the desired gouge to change the angle of cut.

28. A heel gouging machine comprising, in combination, a gouging knife, means relatively to move the knife and a heel blank in one direction to insert the knife into the blank adjacent one end of the seat surface, and thereafter relatively to move the knife and blank in a different direction to gouge said surface with a slicing cut, and means to tilt the knife when the direction of relative movement is changed.

29. A heel gouging machine comprising, in combination, a gouging knife, having a bevel on one side, means to position a heel blank with the end of its seat surface past the cutting edge of the knife and with the heel on the beveled side of the knife, means for relatively moving the blank and knife in one direction to insert the knife into the blank to the full depth of the desired gouge, and thereafter further relatively to move them in a different direction to gouge the seat surface with a slicing cut, and means to hold the knife and to tilt it when the direction of relative movement is changed to maintain the beveled surface of the knife substantially parallel to the direction of said relative movement throughout the cutting action of the knife.

30. A heel gouging machine comprising, in combination, a gouging knife having a bevel on one side, and means for presenting a heel blank on the beveled side of the knife and with the rear end of the seat surface overlapping the cutting edge and for then moving the blank relatively to the knife to insert the knife and gouge the seat surface of the blank with a slicing cut, the knife being held stationary during the gouging operation with the elements of its beveled surface parallel to the direction of relative movement of the knife and blank to prevent the knife from digging in and to prevent it from tearing the stock of the heel blank.

31. A heel gouging machine comprising, in combination, a flat gouging knife having a bevel on the side which is to come next a heel blank, and having a curved cutting edge, and means for traversing the heel blank relatively to the knife to gouge the seat surface of the blank with the elements of the beveled surface of the knife substantially parallel to the direction of relative traversing motion throughout the major part of the gouging and cutting to prevent it from digging in, and for holding the knife at an angle to the direction of relative movement such that the projection of said curved cutting edge on the breast surface of the heel blank is of the same curvature as the cross-section of the desired gouge.

32. A heel gouging machine comprising, in combination, a gouging knife of the "drag" or normally stationary type, means for relatively moving the knife and a heel blank to insert the knife into the blank and then to feed the blank past the knife to gouge its seat surface, and means to tilt the knife about an axis adjacent its cutting edge so that the knife stands at different angles in entering and in gouging the blanks.

33. A heel gouging machine comprising, in combination, a gouging knife of the "drag" or normally stationary type, a feeding device to force a heel blank against the knife and to feed it past the knife to gouge its seat surface, and cam-controlled mechanism for tilting the knife about an axis adjacent its cutting edge after it has been inserted into the heel blank.

34. A heel gouging machine comprising, in combination, a gouging knife of the "drag" or normally stationary type, feeding means including a roller having a matrix portion to force a flat heel blank against and past the knife to gouge its seat surface, and means to tilt the knife about an axis adjacent its cutting edge after it has been inserted in the heel blank.

35. A heel gouging machine comprising, in combination, a gouging knife of the "drag" or normally stationary type, feeding means including a yieldingly supported roll and a cooperating roll having a matrix portion to force a flat heel blank supported by the first roll against and past the knife to gouge its seat surface, and means for tilting the knife about an axis adjacent its cutting edge after it has been inserted in a blank.

36. A heel gouging machine comprising, in combination, a flat gouging knife supported at an angle to the horizontal and having a cutting edge curved so that its vertical projection is the same as the desired cross-section of the gouge in a heel blank, and feeding means for forcing a heel blank against the knife and feeding it past the knife in a substantially horizontal direction to form a gouge on its seat surface with a cross-section of the same curvature as the vertical projection of the cutting edge of the knife.

37. A heel gouging machine comprising, in combination, a flat beveled gouging knife supported at an angle to the horizontal and having a cutting edge curved so that its vertical projection is the same as the desired cross-section of the gouge in a heel blank, and feeding means for forcing a heel blank against the knife and feeding it past the knife in a substantially horizontal direction to form a gouge on its seat surface with a cross-section of the same curvature as the vertical projection of the cutting edge of the knife.

38. A flat knife for gouging heel blanks having a cutting edge formed by the intersection of one of the flat faces of the knife and a cylindrically ground beveled surface formed about an axis extending at an acute angle to the flat surfaces of the knife with such a radius that a section of said cylindrical surface perpendicular to its elements is of the same curvature as the cross-section of the gouged surface which it is desired to produce in a heel.

39. A heel gouging machine comprising, in combination, heel gouging means, and a device to adjust said means to cause it to operate either (1) to produce a gouge cavity of predetermined depth, or (2) to produce a gouged heel of predetermined thickness.

40. A heel-gouging machine comprising, in combination, a gouging cutter, blank-supporting means, said cutter and means being relatively movable heightwise of a heel blank to cause the cutter to enter the seat face of the blank to the depth of the desired gouge, and a device alternatively adjustable either (1) to limit the extent of said relative heightwise movement to produce a gouge of predetermined depth, or (2) to permit relative heightwise movement of predetermined extent to produce a gouged blank of predetermined thickness.

41. A heel gouging machine comprising, in combination, a gouging cutter, blank positioning and supporting means including a member engaging the tread surface of the blank, mechanism relatively to move the cutter and said member to cause the cutter to gouge the seat surface of the blank, and a device alternatively adjustable either (1) to limit the extent of such relative movement heightwise of the blank to produce a gouge of predetermined depth, or (2) to permit relative movement of definite extent heightwise of the blank to produce a gouged blank of predetermined thickness.

42. A machine of the class described having, in combination, a cutter, work-supporting means, means for relatively moving the cutter and said means toward one another to cause the cutter to enter the work, and a device alternatively adjustable either (1) to limit the extent of relative movement to cause the cutter to enter the work to a predetermined depth, or (2) to permit relative movement of predetermined extent.

43. A machine of the class described having, in combination, a knife for gouging the seat face of a heel inwardly of the margin thereof, and a member in fixed position relatively to the knife arranged to support the heel by engagement with the opposite uncut margins of the seat face, during the gouging operation.

44. A machine of the class described having, in combination, a supporting member having a surface to engage opposite sides of the seat face of a heel, and a knife in fixed relation to said member and extending across the surface to operate on the seat face of the heel, said knife having a curved cutting edge and a cylindrical beveled surface adjoining the cutting edge with its elements parallel to said surface on the supporting member.

45. A machine of the class described having, in combination, a supporting member having a surface to engage the seat face of a heel, a knife in fixed relation to said member and extending across the surface to operate on the seat face of the heel, and means relatively to move a heel and the knife to force the knife into the heel until said surface engages the heel and then relatively to traverse the knife and heel to gouge the heel.

46. A machine of the class described having, in combination, a member having a substantially horizontally disposed heel-supporting surface, and a flat knife arranged to extend from below at an acute angle across said surface to be inserted into a heel supported thereby, said knife being formed with a curved bevel the elements of which are parallel to said surface, the bevel and one of the flat faces of the knife intersecting to form a heel-gouging cutting edge the vertical projection of which is curved the same as the cross-section of the desired gouge of the heel.

47. A machine of the class described having, in combination, a tiltable carrier having a heel-engaging surface, and a knife secured to the carrier in such a manner as to extend across said surface as described, whereby said surface limits the depth of insertion of the knife and steadies the heel.

48. A machine of the class described having, in combination, a supporting member having a surface to engage opposite sides of the seat face of a heel, a knife in fixed relation to said member and extending across the surface to operate on the seat face of the heel, said knife having a curved cutting edge and a cylindrical bevel surface adjoining the cutting edge with its elements parallel to said surface on the supporting member, and means relatively to move the knife and a heel to insert the knife into the heel with the elements of said surfaces at an acute angle to the seat face of the heel and then relatively to tilt the heel, and the knife and said member, to make said elements parallel to the seat face of the heel.

49. A machine of the class described comprising, in combination, a normally stationary knife, feeding means for traversing a piece of stock past the knife to be operated on thereby, and cam-operated means for tilting the knife in timed relation to the feed of the stock about an axis passing adjacent the cutting edge of the knife to make two angularly related cuts as described.

50. A machine of the class described comprising, in combination, a normally stationary knife, feeding means to force a piece of stock against the cutting edge of the knife and past the knife, and mechanically-controlled means for tilting the knife about an axis passing adjacent its cutting edge in timed relation to the operation of said feeding means to form two angularly related cuts as described.

51. A machine of the class described comprising, in combination, a pair of co-operating stock controlling and feeding rolls, a normally stationary knife with its cutting edge adjacent the bite of the rolls, and means for tilting the knife while it is operating upon a piece of stock fed by said rolls.

52. A machine of the class described comprising, in combination, a supporting roll, a stock controlling and feeding roll having a matrix to co-operate with the supporting roll, a normally stationary knife having its cutting edge adjacent the bite between said rolls, and mechanism for operating said matrix roll and for tilting the knife in timed relation to the operation thereof.

53. A machine of the class described comprising, in combination, a stock supporting roll, a co-operating feed roll, a matrix partially surrounding the feed roll to engage and assist in feeding a piece of stock engaged by the supporting roll, a knife having its cutting edge adjacent the bite between said rolls, feeding means to insert a piece of stock between the supporting roll and the exposed portion of the feed roll with the forward end of said piece of stock beyond and above the cutting edge of said knife, and means for operating said feed roll to cause the matrix to engage the piece of stock and force it against and across said knife.

54. A machine of the class described comprising, in combination, a stock supporting roll, a co-operating feed roll, a matrix partially surrounding the feed roll to engage and assist in feeding a piece of stock engaged by the supporting roll, a normally stationary knife having its cutting edge adjacent the bite between said rolls, feeding means to insert a piece of stock between the supporting roll and the exposed portion of the feed roll with the forward end of said piece of stock beyond and above the cutting edge of said knife, means for operating said feed roll to cause the matrix to engage the piece of stock and force it against and across said knife, and means for tilting said knife in timed relation to the operation of said matrix portion.

55. A machine of the class described comprising, in combination, stock feeding and supporting means, a knife to operate on stock fed thereby, a cooperating support and carrier for the knife, one of which is formed with an arcuate guide portion and the other of which is formed with a slide guided thereby, the center of the arc of said guide portion being substantially in a line with the cutting edge of said knife, and means for automatically moving said carrier on said support to tilt the knife in timed relation to the feeding of the stock.

56. A machine of the class described comprising, in combination, stock feeding and supporting means, a tilting knife arranged with its cutting edge in position to operate upon stock fed thereby, a rotary shaft, and connections from said shaft for operating said means and tilting said knife in timed relation to cause the knife to form two angularly related cuts upon stock fed by said means.

57. A machine of the class described comprising, in combination, a tiltable knife, stock feeding and supporting means including a reciprocating pusher for advancing successive pieces of stock to be operated on by said knife, and cam-controlled levers for operating said pusher and for tilting said knife in timed relation.

58. A machine of the class described comprising, in combination, a knife, means for relatively traversing a piece of stock and said knife to cause the knife to operate on the stock, and means for tilting the knife about an axis tangent to its cutting edge in timed relation to said relative traversing motion to change the angle of cut of said knife at a predetermined point in the stock.

59. A machine for forming a Coburn lip at the breast end of the seat surface of a heel comprising, in combination, a lip forming knife, means for relatively moving said knife and a heel to remove waste material from the breast end of the seat surface of the heel to form a Coburn lip, and a mounting for tilting said knife to vary the angle at which it is held during said lip-forming operation.

60. A machine for forming a Coburn lip at the breast end of the seat surface of a heel comprising, in combination, a lip forming knife, and co-operating members to hold the knife formed with an arcuate recess and a slide moving therein to adjust the angle of said knife together with means for clamping said members in adjusted position.

61. A machine for forming a Coburn lip at the breast end of the seat surface of a heel comprising, in combination, a lip forming knife, a feed roll to engage heel blanks to be operated on by said knife, and a cam device connected to said roll for depressing it to force the blanks against the knife.

62. A machine for forming a Coburn lip at the breast end of the seat surface of a heel comprising, in combination, a lip forming knife, a feed roll to engage heel blanks to be operated on by said knife, and a cam device connected to said roll for depressing it to force the blanks against the knife, said device including means adjustable to vary the extent to which each blank is depressed relatively to said knife.

63. A machine for forming a Coburn lip, at the breast end of the seat surface of a heel comprising, in combination, a lip forming cutter, and feeding mechanism including a reciprocating pusher to advance heels successively to said cutter and means for relatively moving the heels and the cutter to remove stock from the breast end of the seat surface of each heel to form a Coburn lip.

64. A machine for forming a Coburn lip at the breast end of the seat surface of a heel comprising, in combination, a lip forming cutter, and feeding mechanism including a reciprocating pusher for advancing a succession of heels and forcing each heel against said cutter to remove stock from the breast end of its seat surface to form a Coburn lip.

65. A machine for forming a Coburn lip at the breast end of the seat surface of a heel comprising, in combination, a lip forming cutter, means including a reciprocating pusher for moving a heel horizontally past said cutter, auxiliary means for relatively vertically moving the heel and the cutter to remove stock from the breast end of the seat surface to form a Coburn lip, and mechanism to reciprocate said pusher and operate said auxiliary means in timed relation.

66. A machine for forming a Coburn lip at the breast end of the seat surface of a heel comprising, in combination, a lip forming cutter, means including a reciprocating pusher for moving a heel horizontally past said cutter, auxiliary means for relatively vertically moving the heel and the cutter to remove stock from the breast end of the seat surface to form a Coburn lip, mechanism to reciprocate said pusher and operate said auxiliary means in timed relation, and an adjusting device to vary said timed relation.

67. A machine for forming a Coburn lip at the breast end of the seat surface of a heel comprising, in combination, a lip forming cutter, a roll to advance a heel blank past said cutter, means for feeding heels successively to said roll, and cam-controlled mechanism for depressing a blank fed by said roll to force it against the cutter to remove waste stock from the breast end of the heel surface to form a Coburn lip.

68. A machine for forming a Coburn lip at the breast end of the seat surface of a heel comprising, in combination, a lip forming cutter, a roll to advance a heel blank past said cutter, means for feeding heels successively to said roll, and cam-controlled mechanism for depressing a blank fed by said roll to force it against the cutter to remove waste stock from the breast end of the heel surface to form a Coburn lip, said means and said mechanism operating in timed relation, and an adjusting device to vary said timed relation.

69. A machine for forming a Coburn lip at the breast end of the seat surface of a heel comprising, in combination, lip forming means, a heel feeding and depressing roll, spring means urging the roll away from said lip forming means, co-operating cam and roller devices for depressing the roll to force a heel blank against the lip forming means.

70. A machine for forming a Coburn lip at the breast end of the seat surface of a heel comprising, in combination, lip forming means, a heel feeding and depressing roll, spring means urging the roll away from said lip forming means, co-opearting cam and roller devices for depressing the roll to force a heel blank against the lip forming means, and an adjusting device to vary the position of the roll and the cam and roller devices relatively to the lip forming means.

71. A machine for forming a Coburn lip at the breast end of the seat surface of a heel comprising, in combination, a stationary lip forming knife, a spring-supported table to hold a heel blank above the cutting edge of said knife, means to advance a heel blank across said table until the cutting edge of the knife is opposite the beginning of a Coburn lip, and means for forcing the heel blank toward the knife against the resistance of said spring supported table to remove waste material from the breast end of the seat surface to form a Coburn lip.

72. A lip-cutting machine comprising, in combination, a blank feeding and depressing roll, and a lip knife below the roll to operate on blanks depressed thereby, the knife being arranged with its cutting edge substantially in vertical alinement with the axis of the roll.

73. A lip-cutting machine comprising, in combination, a blank feeding and depressing roll, a lip knife below the roll to operate on blanks depressed thereby, the knife being arranged with its cutting edge substantially in vertical alinement with the axis of the roll, and a spring-supported member adjacent the knife and opposite said roll.

74. A lip-cutting machine comprising, in combination, a lip knife, and means to force a blank against the knife, to produce the lip cut in a manner to prevent the blank from tipping, said knife serving as a support for the blank during the cutting operation.

75. A machine for gouging heel blanks comprising, in combination, a cutter, means including a reciprocating pusher to position a flat heel blank with its seat surface opposite the cutter, and auxiliary roller means relatively to move the blank and the cutter in a direction normal to the line of feed to bring the cutter into engagement with the seat face of the heel blank, said means and auxiliary means being constructed and arranged to hold the heel blank flat without distortion.

76. A machine for operating upon heel blanks as described comprising, in combination, a heel feeding and depressing roller, springs urging said roller upwardly, depressing cams carried by the roller, abutments mounted thereon and engaging said cams, said springs holding the cams in engagement with the roller abutments, and adjustable members to determine the position of the arms and the roller abutments mounted thereon to vary the position of said roller.

77. A machine for operating upon heel blanks as described comprising in combination, a heel feeding and depressing roller, cams for depressing said roller, a reciprocating pusher for presenting heels thereto, connected mechanisms for operating the cams and the pusher in timed relation, and an adjusting device to change said timed relation.

78. A machine of the class described having, in combination, a roll, a knife below the roll with its cutting edge in vertical alinement with the axis of the roll, and a yielding work support adjacent the cutting edge of the knife and opposite the roll.

79. A machine of the class described comprising, in combination, a stationary drag knife, a yieldingly supported member to engage one side of a piece of stock operated on by said knife, a roller to engage the opposite side of said piece of stock, depressing cams connected to said roller to force it toward the knife, and roller abutments engaging the cams and mounted to turn about stationary axes to cause said cams to depress the roller.

80. A machine of the class described comprising, in combination, a stationary drag knife, a yieldingly supported member to engage one side of a piece of stock operated on by said knife, a roller to engage the opposite side of said piece of stock, depressing cams connected to said roller to force it toward the knife, and roller abutments engaging the cams and mounted to turn about stationary axes to cause said cams to depress the roller, and a mounting for the knife for adjusting it angularly about an axis adjacent its cutting edge.

81. A machine of the class described comprising, in combination, a yieldingly supported table to engage one side of a piece of stock, a feeding and depressing roller to engage the opposite side of said piece of stock, cam mechanism for depressing a piece of stock engaged by said roller, a reciprocating pusher to advance pieces of stock successively between said table and said roller, and mechanism for operating the cam mechanism and pusher in timed relation.

82. A machine of the class described comprising, in combination, a yieldingly supported table to engage one side of a piece of stock, a feeding and depressing roller to engage the opposite side of said piece of stock, cam mechanism for depressing a piece of stock engaged by said roller, a reciprocating pusher to advance pieces of stock successively between said table and said roller, mechanism for operating the cam mechanism and pusher in timed relation, and an adjusting device for changing said timed relation.

83. Feed mechanism of the class described comprising, in combination, a horizontal guide at an upper level, a second horizontal guide at a lower level arranged to receive pieces of stock from the upper guide, and a reciprocating pusher arranged to form part of the bottom of the upper guide and to advance pieces of stock successively along the lower guide.

84. Feed mechanism of the class described comprising, in combination, a guide at an upper level, a second guide at a lower level arranged to receive pieces of stock from the upper guide, the bottom of the upper guide adjacent its end being formed with a stationary portion and with a horizontally sliding portion to act as a pusher to advance pieces of stock successively along the lower guide.

In testimony whereof I have signed my name to this specification.

ERASTUS E. WINKLEY.